(12) United States Patent
Castellano et al.

(10) Patent No.: US 7,234,007 B2
(45) Date of Patent: *Jun. 19, 2007

(54) ADJUSTABLE ELASTICITY FIFO BUFFER HAVE A NUMBER OF STORAGE CELLS EQUAL TO A FREQUENCY OFFSET TIMES A NUMBER OF DATA UNITS IN A DATA STREAM

(75) Inventors: Andrew Castellano, Laguna Beach, CA (US); Pinghua Peter Yang, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 488 days.

This patent is subject to a terminal disclaimer.

(21) Appl. No.: 10/811,126

(22) Filed: Mar. 29, 2004

(65) Prior Publication Data

US 2005/0058148 A1 Mar. 17, 2005

Related U.S. Application Data

(60) Provisional application No. 60/502,674, filed on Sep. 15, 2003, provisional application No. 60/549,940, filed on Mar. 5, 2004.

(51) Int. Cl.
*G06F 3/00* (2006.01)
*G06F 3/02* (2006.01)
*G06F 3/05* (2006.01)

(52) U.S. Cl. .......................... 710/29; 710/33; 710/52; 710/58; 710/60

(58) Field of Classification Search ................. 710/29, 710/33, 52, 58, 60
See application file for complete search history.

(56) References Cited

U.S. PATENT DOCUMENTS

| 4,600,945 A | * | 7/1986 | Bolger ...................... 348/806 |
| 6,233,629 B1 | | 5/2001 | Castellano |
| 6,408,349 B1 | | 6/2002 | Castellano |
| 6,611,884 B2 | | 8/2003 | Castellano |

FOREIGN PATENT DOCUMENTS

WO    WO 97/17777    *    5/1997

OTHER PUBLICATIONS

PCI Express Base Specification Revision 1.0a, by PCI-SIG, Apr. 15, 2003, pp. 1-220.

* cited by examiner

*Primary Examiner*—Tammara Peyton
(74) *Attorney, Agent, or Firm*—Squire, Sanders & Dempsey, L.L.P.

(57) ABSTRACT

A method of processing a data stream through a buffer is performed in accordance with a write clock and a read clock. The buffer has a plurality of sequentially numbered storage cells. The method includes the steps of selecting an initial preload value, with the selecting step including determining a product of the maximum frequency offset between the write and read clocks, and a maximum time between arbitrary symbols in the data stream. The storage cells then receive data units in response to a write pointer. Data units are then provided from the storage cells in response to a read pointer.

6 Claims, 7 Drawing Sheets

ADJUSTABLE ELASTICITY FIFO BUFFER HAVE A NUMBER OF STORAGE CELLS EQUAL TO A FREQUENCY OFFSET TIMES A NUMBER OF DATA UNITS IN A DATA STREAM

REFERENCE TO RELATED APPLICATIONS

This application claims priority of U.S. Provisional Patent Application Ser. No. 60/502,674, filed on Sep. 15, 2003, and Provisional Application Ser. No. 60/549,940, filed on Mar. 5, 2004, the contents of which are hereby incorporated by reference.

BACKGROUND OF THE INVENTION

1. Field of the Invention

This invention relates to buffers used within data communications systems and more particularly to a self-adjusting elasticity buffer for processing streams of data.

2. Description of Related Art

Figure 1:
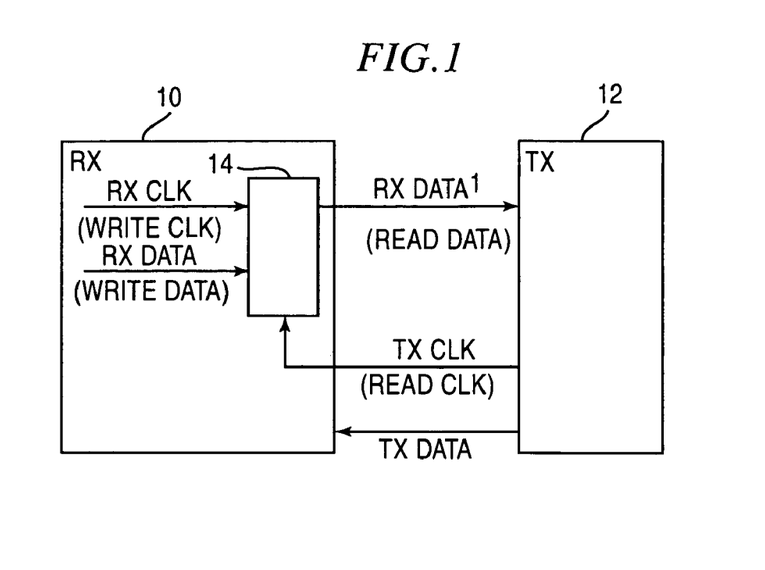
FIG. 1 is a block diagram of a communications system including an elasticity buffer.

Data communication devices, such as shown in FIG. 1, often use elasticity buffers to re-synchronize a data stream from one clock domain to another. Within the receiver (RX), the data stream is written into an elasticity buffer in accordance with a receive clock signal (RX CLK), i. e. write clock, in the form of original receive data (RX DATA), i. e., write data. The RX DATA is subsequently read out of the buffer in accordance with a transmit clock signal (TX CLK), i. e., read clock. Thus when the read data is received by the transmitter it is synchronous with the transmit clock.

Figure 2:
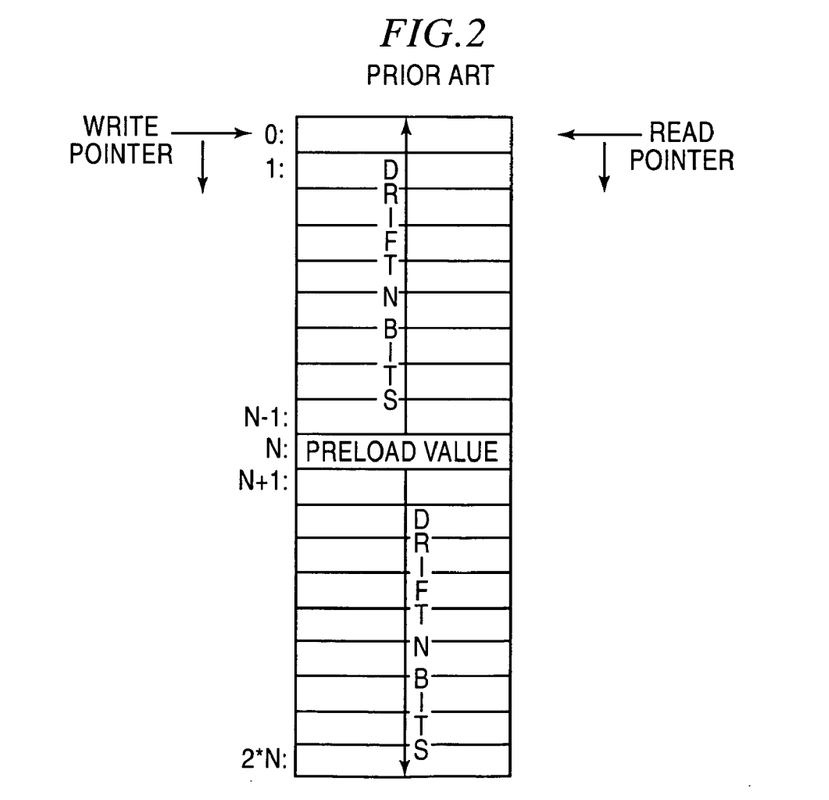
FIG. 2 depicts an FIFO buffer having 2N storage cells stacked for having data written to by a write-pointer and data subsequently read from by a read pointer.

In a typical implementation, the elasticity buffer is implemented using a first-in first-out (FIFO) buffer that writes data words using a write clock and reads the data words using a separate read clock. With reference to FIG. 2, each of the words in the data stream is individually written into the buffer in individual cells beginning at 0, as indicated by the write pointer. Once data is written into the cell numbered N, data is read from the buffer beginning at cell 0, as indicated by the read pointer. The write pointer continues to write data to buffer cells N+1 through 2N as the read pointer continues to read data. After writing data to the 2N cell the write pointer begins writing data to the 0 cell again, thus the buffer is circular in nature.

Ideally, when the read clock and write clock are operating at the same frequency, the read pointer lags the write pointer by N words through the entire write/read cycle. However, the read clock and write clock inputs to the elasticity buffer are often offset in frequency. The frequency offset causes relative movement between the read and write pointers which, over time, increases or decreases the gap between the two pointers depending on the frequencies of the write and read clocks. This relative movement of the read and write pointers is referred to as "drift." When data is being written to the buffer faster than it is being read, the write pointer drifts toward the read pointer and eventually passes the read pointer. This condition is referred to as an "overrun" because the write pointer writes data to a buffer cell which contains data which has not yet been read by the read pointer. When data is being read from the buffer faster than it is being written, the read pointer drifts toward the write pointer and eventually passes the write pointer. This condition is referred to as an "underrun" because the read pointer reads data from a buffer which has not yet had data written to it by the write pointer. Either an overrun or underrun condition results in the corruption of data. The system typically includes a mechanism for detecting these conditions and providing an error signal.

Current designs of the elasticity buffer attempt to compensate for overrun and underrun conditions by sizing the elasticity buffer to accommodate for the maximum "frequency offset" between the write and read clocks. The frequency offset is relative to the data rate of the system and is defined by the difference between the write frequency and the read frequency, divided by the data rate.

Accordingly, if the data rate of the system is 50 Mhz and the difference between the write clock and read clock frequencies is 10 kHz the frequency offset is 0.0002. This value is commonly expressed as 200 part-per-million (ppm).

In a standard elasticity buffer the FIFO size is at least 2N, where N is defined by the following equation:

$$N = \text{maximum frequency offset} \times \text{maximum data length}$$

where data length.sub.max=the maximum length of the data stream in words. This assumes that the data stream is a finite stream such as a data packet or data cell.

For a maximum frequency offset of 200 ppm and a maximum data stream length of 40,000 words, N equals 8. Thus, the size of the standard elasticity buffer is 16. In operation, the elasticity buffer is loaded halfway, to a "preload value" of N, before the reading of data begins. This allows the read pointer to drift N words in either direction without causing a loss of data by an overrun or underrun condition. This preloading, however, introduces an initial delay in the reading of data. This delay is referred to as a latency and is described further below.

Figure 3A:
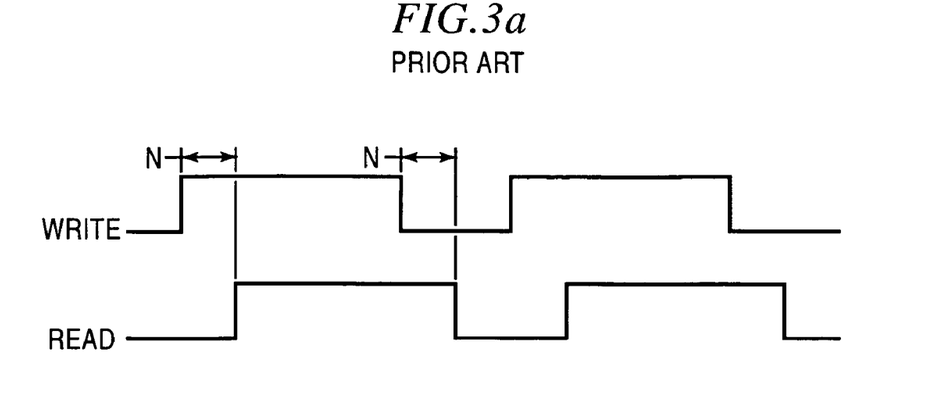
FIG. 3a is a timing diagram depicting the writing and reading of data packets into and from the buffer of FIG. 2 using write and read clocks that operate at the same frequency.
Figure 3B:
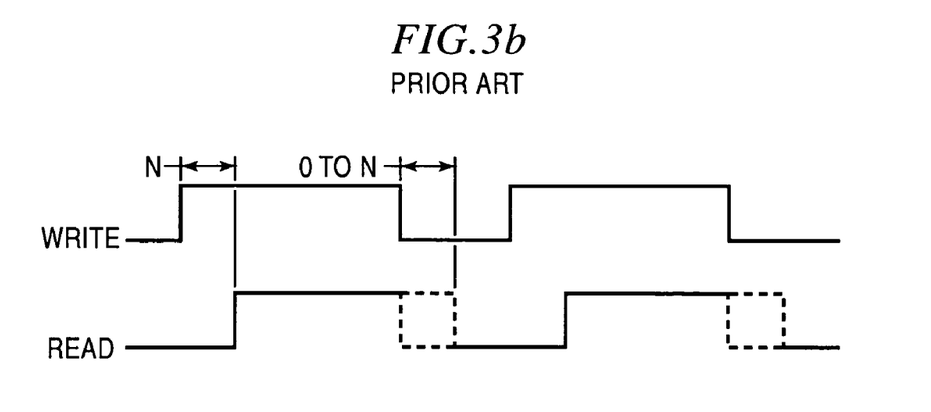
FIG. 3b is a timing diagram depicting the writing and reading of data packets into and from the buffer of FIG. 2 using a write clock having a frequency that is slower than the read clock frequency.
Figure 3C:
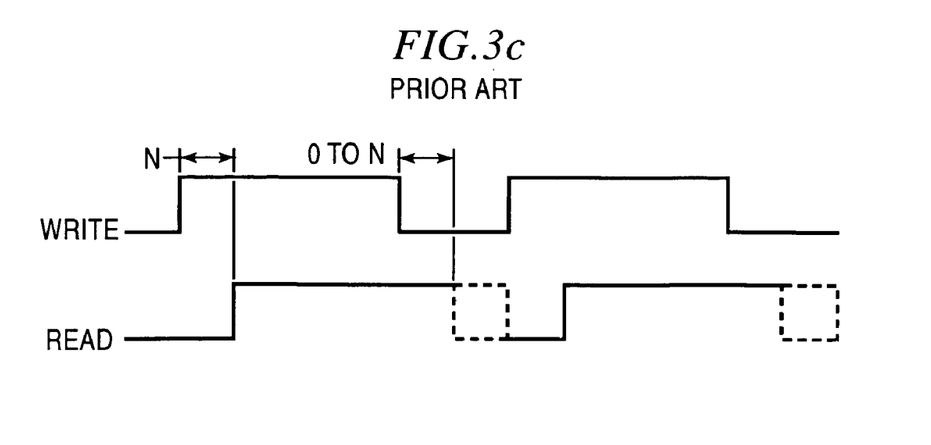
FIG. 3c is a timing diagram depicting the writing and reading of data packets into and from the buffer of FIG. 2 using write clock having a frequency that is faster than the read clock.

Disadvantages associated with this implementation of the elasticity buffer include the FIFO size and latency. As mentioned above, the size of the buffer is at least 2N in order to accommodate the maximum possible drift between the read and write pointers. Latency is the amount of time between the writing of a word into the buffer and the reading of a word from the buffer. The latency between the data in and data out of the buffer are shown in FIGS. 3a through 3c. As shown in FIG. 3a, the latency at the start of the data stream is N, because N words are written before the read pointer starts reading. At the end of the data stream, the latency is between 0 and 2N words, depending on the relative frequencies of the write and read clocks. If the clocks are running at the same frequency the latency is N, as shown in FIG. 3a. If the read clock is running faster than the write clock the latency approaches zero, as shown in FIG. 3b, whereas if the write clock is running faster than the read clock the latency approaches 2N, as shown in FIG. 3c. As the latency approaches 2N the possibility of the present data stream interfering with a subsequent data stream increases.

A need exists to provide a buffer of reduced size with reduced latency for streaming data, such as that which is used in CPU access applications where there is no defined inter-packet gap (IPG). In such applications, there is no definite end to a manageable portion of a data stream such as an end of a packet or an end of a cell.

Known configurations with respect to finite-length data streams or data units such as data packets or data cells are discussed, for example, in U.S. Pat. Nos. 6,239,629, and 6,408,349. Embodiments of the invention discussed herein are directed to streaming data, where no IPG exists between embedded packets or cells in the data stream. Since this can result in an essentially "infinite" data stream, additional considerations are necessary in order to effectively utilize a FIFO buffer without unnecessary waste.

SUMMARY OF THE INVENTION

The invention, in one embodiment, is therefore directed to a method of processing a data stream through a buffer in accordance with a write clock and a read clock, the buffer having a plurality of sequentially numbered storage cells. The method includes the steps of selecting an initial preload value, with the step of selecting including determining a product of the maximum frequency offset between the write and read clocks, and a maximum time between arbitrary symbols in the data stream. The next step is receiving, in the storage cells, data units in response to a write pointer. Data units are then provided from the storage cells in response to a read pointer.

In another embodiment, the invention includes a method of compensating for drift between a write pointer and a read pointer processing a continuous data stream through a FIFO buffer. The write and read pointers operate in accordance with a write and read clock, respectively. The method includes the steps of setting a size of a FIFO buffer to include a number of storage cells equal to a maximum frequency offset between a write clock and a read clock, and a maximum number of data units in a data interval defined by two arbitrary symbols. A start of the read pointer is delayed, relative to the write pointer, by a portion of the storage cells in the FIFO. It is then determined if the read pointer is drifting toward or away from the write pointer. If the read pointer is drifting away from the write pointer, for subsequent data intervals, a selected number of arbitrary symbols are deleted from the buffer so that the read pointer is started almost immediately after the write pointer writes to the first storage cell in the FIFO. If the read pointer is drifting toward the write pointer, for subsequent data intervals, additional arbitrary symbols are added to buffer so that the read pointer is started almost immediately prior to the time at which the write pointer writes to the last storage cell in the FIFO.

In another embodiment, the invention includes a buffer for allowing influx and outflow of data in a data stream. The buffer comprises a write pointer for writing data in accordance with a frequency of a write clock, and a read pointer for reading data in accordance with a frequency of a read clock. A number of storage cells are provided, with the number of storage cells being substantially equal to a product of a maximum frequency offset between the write clock and the read clock, and a maximum number of data units in a data interval between arbitrary symbols in the data stream.

The invention, therefore, also includes a method of selecting a size of an elasticity buffer. The method includes a step of determining a frequency offset based upon a speed differential between a write clock and a read clock, and also determining a maximum length of a data interval, with a data interval being defined as a number of data units between a predetermined symbol type. The invention then includes multiplying the maximum frequency offset by the maximum number of data units in the data interval, with the number of storage cells being based upon the product of the multiplication.

These and other aspects and advantages of the present invention will become apparent from the following more detailed description, when taken in conjunction with the accompanying drawings which illustrate, by way of example, the preferred embodiments of the invention.

DETAILED DESCRIPTION OF THE PREFERRED EMBODIMENT(S)

The invention utilizes preselected data symbols in a data stream, such as skip or SKP symbols which are used, for example, in the PCI Express Specification. The use of a maximum length between these arbitrary symbols in calculating buffer size can maximize buffering efficiency. The skip symbols themselves can also be referred to as arbitrary symbols.

The PCI Express Specification as it exists in September of 2003 specifies ordered sets such as skip symbols which can be used to compensate for differences in frequencies between bit rates at the ends of a link. Elastic buffering can perform this compensation using skip symbols which are inserted in various transmission lanes at various times, with skip symbols being accumulated and inserted appropriately to compensate for various types of drift. The invention, therefore, maximizes the efficiency in size selection of the elasticity buffer, therefore, by setting the size of the buffer to be substantially equal to the product of the maximum frequency offset between the write and read clocks, and a maximum number of data units, such as bits or bytes, which are disposed between skip symbols or other arbitrary symbol. This enables the size of the elasticity buffer to be efficiently selected in streaming applications which do not necessarily utilize a gap or a set spacing between embedded data packets, data cells, or other datagrams. For the purposes of this discussion, therefore, the data bits or bytes which are disposed between two skip symbols will be referred to as a data interval, or merely as an interval.

Data communication devices, such as shown in FIG. 1, include a receiver (RX) 10, a transmitter 12, and a self-adjusting elasticity buffer 14. This buffer 14 is used to re-synchronize a data stream from one clock domain to another. Within the receiver 10, intervals in a data stream are written into the elasticity buffer 14 in accordance with a receive clock signal (RX CLK), i. e., write clock, in the form of original receive data (RX DATA), i. e., write data. The data contained within the interval may be in any of several forms such as 2-bit, 4-bit or 8-bit words. The RX DATA is subsequently read out of the buffer 14 in accordance with a transmit clock signal (TX CLK), i. e., read clock. Thus when the read data is received by the transmitter 12 it is synchronous with the transmit clock. Buffer 14 would logically be disposed to encounter the data stream at the ingress of the data communication device.

Figure 4:
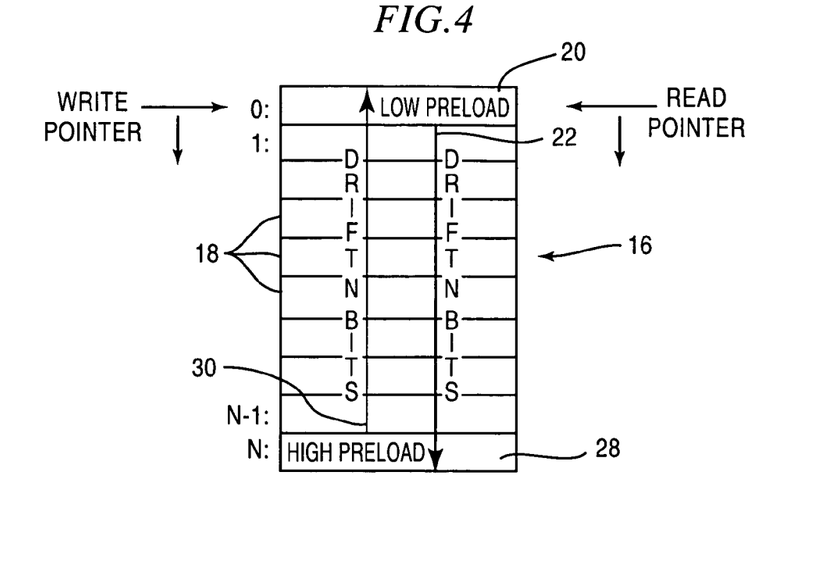
FIG. 4 depicts a self-adjusting elasticity buffer having N storage cells stacked for having data written to by a write pointer and data subsequently read from by a read pointer in either a low preload or high preload operating condition.

The self-adjusting elasticity buffer 14 is implemented by using a first-in first-out (FIFO) buffer that writes data words using a write pointer operating in accordance with a write clock and reads the data words using a read pointer operating in accordance with a separate read clock. With reference to FIG. 4, each of the words in the data stream is individually written into the FIFO buffer 16 in individual storage cells 18 beginning at 0, as indicated by the write pointer. The cells are stacked and identified by consecutive numbers beginning with 0 at the top and ending with N at the bottom, where N is defined by Eq. 2. Once data is written to the cell having the number 0 through N which is designated as the preload value, the read pointer starts to read data from the buffer beginning at cell 0. The write pointer continues to write data to buffer cells as the read pointer continues to read data. After writing data to the N cell the write pointer begins writing data to the 0 cell again, likewise, once the read pointer reads data from the N cell it begins reading data from the 0 cell again, thus the buffer is circular in nature.

At power up of the system the preload value of the system is set to a default value, which could be, for example, N/2. While any default value may be used, this default preload value is chosen because it is likely that the difference between the write clock and read clock frequencies is not large enough to cause an overrun or underrun condition when the preload value is N/2. If the difference between the write and read clocks is significant, the preload value is adjusted. Although the frequencies of the write and read clocks do not change significantly over time, if one clock is significantly faster than the other it is always faster, individual clock frequencies tend to vary from chip to chip. Accordingly, it is not possible to determine, in advance of power up, which of the write or read clocks is faster.

Figure 5A:
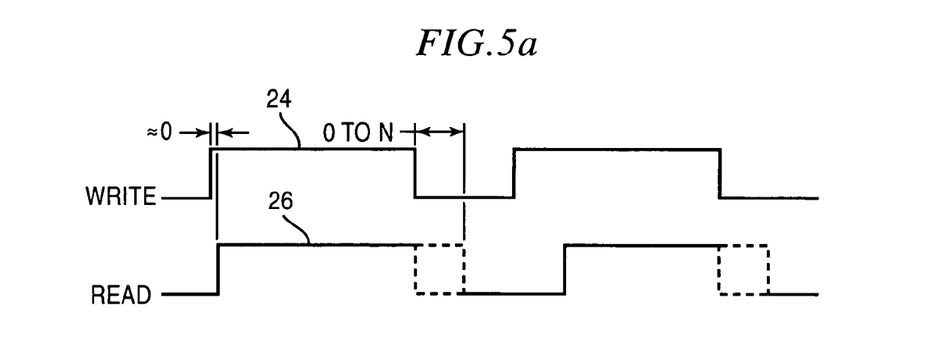
FIG. 5a is a timing diagram depicting the writing and reading of data packets into and from the buffer of FIG. 4 when operating in a low preload condition.

The preload value of the FIFO can be adjusted to take into account the difference in the operating frequencies of the write and read clocks. To determine the preload value, the frequencies of the clocks are monitored during the course of the processing of the first several data intervals. With reference to FIGS. 4 and 5a, if it is determined that the write clock is significantly faster than the read clock, then the preload value is set "low" 20 to substantially zero so that the read pointer begins reading data from cell 0 almost immediately after the write pointer writes data to the cell. In this situation, during the course of processing the remaining data within the data interval, the write pointer drifts ahead of the read pointer, as indicated by the downward arrow 22. Because the value of N is chosen based on the maximum possible offset between the write and read clock frequencies, as set forth in Eq. 2, there are enough storage cells in the buffer to ensure that the writing of data from the data interval is complete before the write pointer overruns the read pointer. As shown in FIG. 5a, input data 24 from the first interval is no longer being written into the buffer while output data 26 continues to be read, as indicated by the dashed lines. Depending on the relative frequencies of the read and write clocks, the reading of data from the data interval may continue from between 0 to N bits past the writing of data.

Figure 5B:
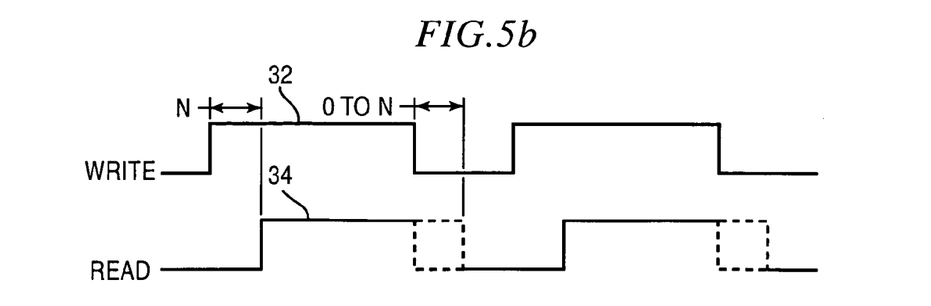
FIG. 5b is a timing diagram depicting the writing and reading of data packets into and from the buffer of FIG. 4 when operating in a high preload condition.

With reference to FIGS. 4 and 5b, if it is determined that the read clock is significantly faster than the write clock, then the preload value is set "high" 28 so that the read pointer does not begin reading data until just about the time that the write pointer writes data to the N cell. In this situation, during the course of processing the remaining data within the data interval, the write pointer drifts toward the read pointer, as indicated by the upward arrow 30. Again, because the value of N is chosen based on the maximum possible offset between the write and read clock frequencies, there are enough storage cells in the buffer to ensure that the writing of data from the interval is complete before the write pointer underruns the read pointer. As shown in FIG. 5b, input data 32 from the first interval is no longer being written into the buffer while output data 34 continues to be read, as indicated by the dashed lines. Depending on the relative frequencies of the read and write clocks, the reading of data from the data interval may continue from between 0 to N bits past the writing of data.

Thus, as shown in FIGS. 5a and 5b, by monitoring the relative frequencies of the read and write clocks, the time at which the reading of data begins relative to the time at which the writing of data begins is adjusted to ensure that neither an overrun nor an underrun condition occurs. In the preferred embodiment, as discussed above, the preload values are set either to a fixed low value, i. e., substantially zero, or a fixed high value, i. e., N. It is possible, however, that the difference between the write clock and read clock frequencies is not significant enough to cause an overrun or underrun. In this situation the preload value remains the default preload value N/2. The low and high values are not fixed at near 0 and near N, respectively. Instead, the low preload is set to any value less than the default preload while the high preload is set to any value greater than the default preload.

Figure 6:
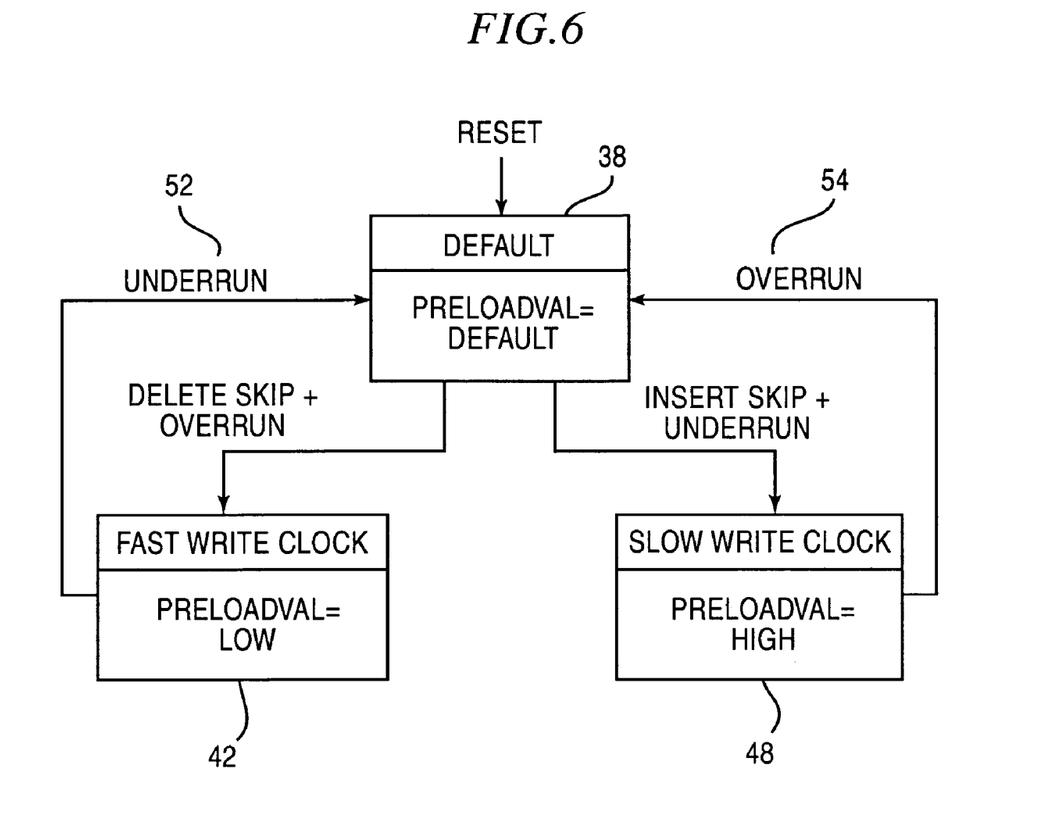
FIG. 6 is a state machine used to determine the preload value of the buffer of FIG. 4.
Figure 7:
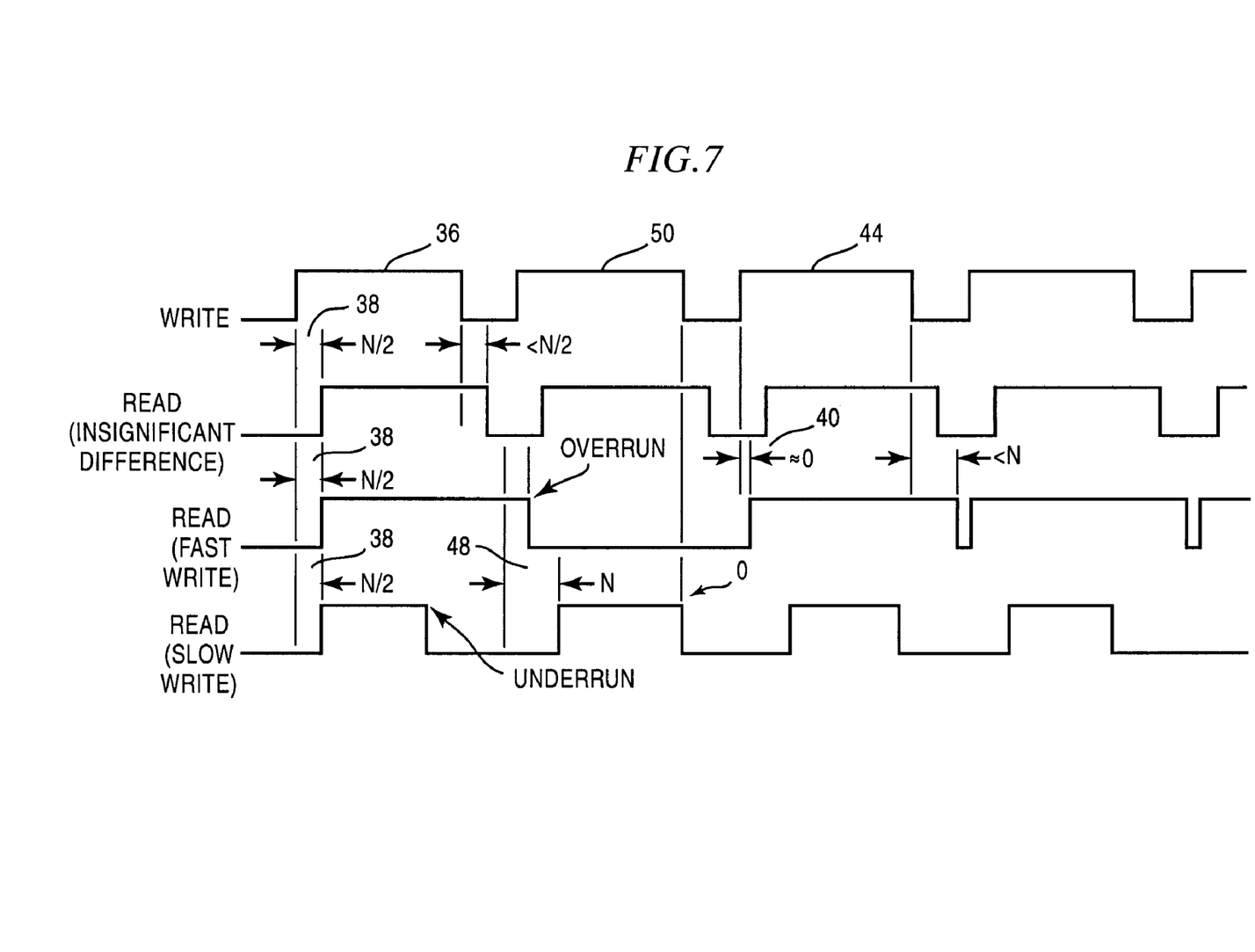
FIG. 7 is a timing diagram depicting the writing and reading of data packets into and from the buffer of FIG. 4 in the following three states: when the write and read clocks operate at the same frequency, when the write clock is significantly faster than the read clock, i. e., an overrun condition, and when the write clock is significantly slower that the read clock, i. e., an underrun condition.
Figure 8:
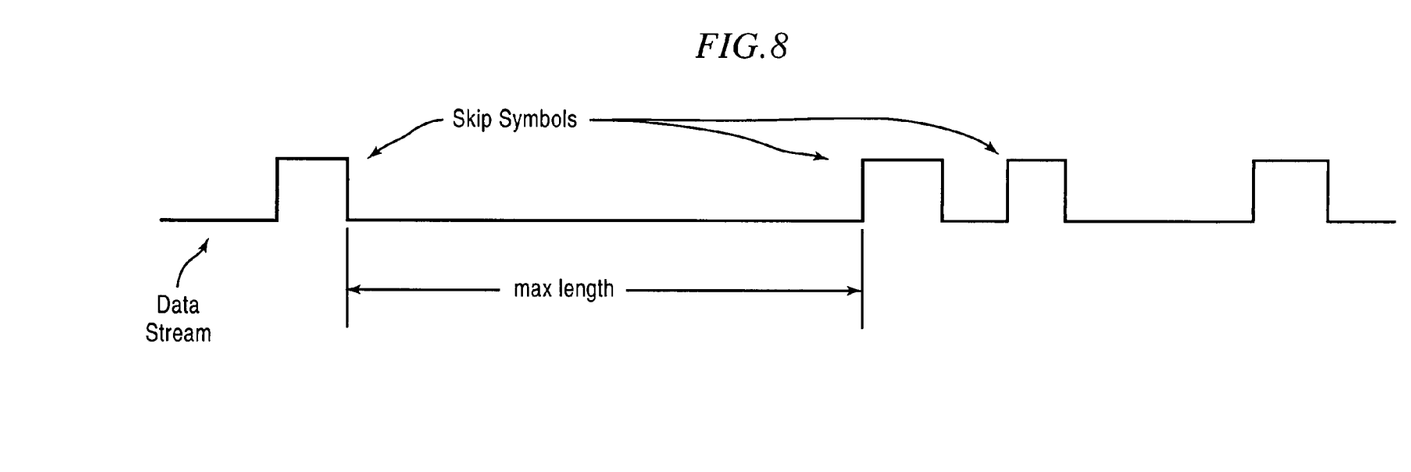
FIG. 8 schematically illustrates a data stream, and shows skip symbols inserted at various points thereupon.
Figure 9:
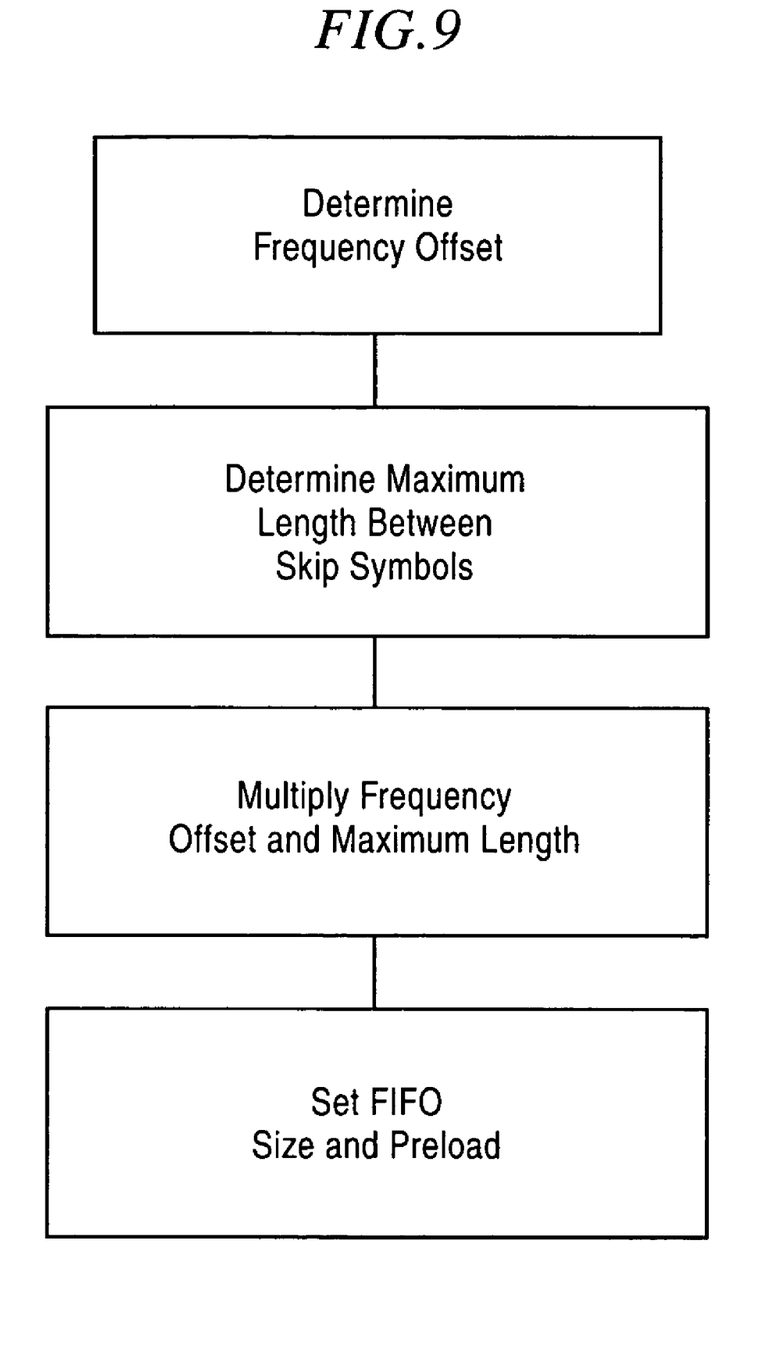
FIG. 9 illustrates a method of determining buffer size based upon skip symbols.

In accordance with the present invention, there are several techniques for determining whether the preload value should be set low or high, or remain at the default value. In one example of the invention, a state machine, as shown in FIG. 6, is used to adjust the preload value. A FIFO which is N words deep is initially set to have a preload level of N/2, as shown at 38 in FIG. 6. This preload level is the number of words which is sought to have, in this example, in the FIFO at the beginning of a data interval. As the data stream begins writing into the FIFO, no reading occurs until the number of words in the FIFO equals the preload value, which in this case is N/2. Once the FIFO level has reached the preload value, data is continuously written to and read from the FIFO. When a symbol such as a skip symbol is received, the reading or writing of data may pause temporarily in order to compensate for differences between the frequencies of the read and write clocks. When a symbol such as a skip symbol is received, if the number of words in the FIFO is greater than the preload value, then skip symbols are removed from the data stream until the number of words in the FIFO is equal to the preload value. Removal or deletion of skip symbols can be accomplished, for example, by merely not writing the skip symbols into the FIFO. Once the skip symbols have been removed, then the preload value is readjusted, in this example, to be smaller, as shown at 42 in FIG. 6. The reduced preload value provides room for greater drift in the positive direction on subsequent data intervals. In addition, the preload value can be readjusted to a smaller value if an overrun condition occurs in the FIFO.

If, however, the number of words in the FIFO in this example is less than the preload value, then skip symbols are added to the data stream until the number of words in the FIFO is equal to the preload value, and then the preload value is readjusted to be larger, as shown at 48 of FIG. 6. Larger, in this case, means adjusting the preload value to be closer to N rather than closer to 0. This allows for greater drift in the negative direction on subsequent data intervals. Skip symbols can be added, for example, by readings words out of the FIFO without advancing the FIFO pointer, which has the effect of adding skip symbols thereto. The adding of skip symbols to the FIFO typically occurs during read cycles, and the deletion or removal of skip symbols typically occurs during the write cycle. To summarize, therefore, in this example, if the number of words counted in the FIFO at the end of a data interval is greater than N/2, the read clock is slower than the write clock, and the preload value is set closer to 0. If the number of words counted after a data interval is less than N/2, then the read clock is faster than the write clock, and the preload value is set higher, closer to N. Additionally, the preload value can be readjusted to a larger value if an underrun condition occurs in the FIFO.

Once the relative frequencies of the write and read clocks are determined and the preload value set, it is beneficial to continue to monitor the relative frequencies of the two clocks for changes. While the write and read clock frequencies of a system remain generally fixed, it is possible for the relative frequencies to change under certain operating conditions. For example, an error may have occurred during the initial determination of the read and write frequencies which may lead to an erroneous determination that the write clock is faster than the read clock. In this situation, as shown in FIG. 6, an underrun error 52 eventually occurs and the state machine is reset, as indicated by feedback path, and the preload value is readjusted. A similar situation may occur when it is initially determined that the write clock is slower than the read clock and a subsequent overrun condition 54 occurs. Relative write and read clock frequencies may change when the system containing the read clock is disconnected from the system containing the write clock and subsequently reconnected to a different system containing a different write clock. In this situation, the frequencies of the different write clock and the read clock need to be compared and the preload value reset and readjusted if necessary.

The adjustment of the preload value noted above will enable, in situations where the write clock is faster than the read clock, to have the read pointer slightly lagging but close to the write pointer. In situations when the read clock is faster than the write clock, the adjustment of the preload value will enable the read pointer to slightly lead the write pointer.

This configuration, therefore, enables dynamic readjustment of the preload value based upon a determination of the relative speeds of the read clock and write clock, so that the invention can achieve a maximized utilization of a minimized FIFO size.

Although this invention has been disclosed and illustrated with reference to particular embodiments, the principles involved are susceptible for use in numerous other embodiments which will be apparent to persons of ordinary skill in the art. The invention is, therefore, to be limited only as indicated by the scope of the appended claims.

The invention claimed is:

1. A buffer for allowing influx and outflow of data in a data stream, said buffer comprising:
    a write pointer for writing data in accordance with a frequency of a write clock;
    a read pointer for reading data in accordance with a frequency of a read clock;
    a number of storage cells, said number of storage cells being substantially equal to a product of a maximum frequency offset between the write clock and the read clock, and a maximum number of data units in a data interval between arbitrary symbols in the data stream.

2. A buffer as recited in claim 1, wherein said arbitrary symbols comprise ordered sets.

3. A buffer as recited in claim 1, wherein said arbitrary symbols comprise skip symbols.

4. A buffer as recited in claim 1, wherein said arbitrary symbols comprise PCI express skip symbols.

5. A buffer as recited in claim 1, wherein the data stream comprises a continuous data stream having datagrams embedded therein, and wherein the arbitrary symbols comprise skip symbols disposed within the continuous data stream.

6. A buffer as recited in claim 1, wherein said buffer is configured to allow influx and outflow of data in a data stream, wherein said data stream is a continuous data stream including embedded datagrams having no inter-packet gap.

* * * * *